United States Patent [19]

Chu et al.

[11] Patent Number: 4,526,880

[45] Date of Patent: Jul. 2, 1985

[54] HYDROTHERMAL ZEOLITE ACTIVATION

[75] Inventors: Pochen Chu, West Deptford; Günter H. Kühl, Cherry Hill, both of N.J.

[73] Assignee: Mobil Oil Corporation, New York, N.Y.

[21] Appl. No.: 631,689

[22] Filed: Jul. 16, 1984

[51] Int. Cl.³ .............................................. B01J 29/28
[52] U.S. Cl. ......................................... 502/71; 502/85
[58] Field of Search ....................... 502/63, 64, 71, 77, 502/85

[56] References Cited

U.S. PATENT DOCUMENTS

| | | | |
|---|---|---|---|
| 4,269,813 | 5/1981 | Klotz | 502/202 X |
| 4,468,475 | 8/1984 | Kuehl | 502/71 |
| 4,478,950 | 10/1984 | Chu | 502/85 |

*Primary Examiner*—Carl F. Dees
*Attorney, Agent, or Firm*—Alexander J. McKillop; Michael G. Gilman; Dennis P. Santini

[57] ABSTRACT

The acid activity of a high silica content crystalline zeolite that contains framework boron is increased by hydrolyzing a portion of the boron before compositing the crystals with a binder that contains alumina.

18 Claims, No Drawings

HYDROTHERMAL ZEOLITE ACTIVATION

FIELD OF THE INVENTION

This invention relates to a method for increasing the catalytic activity of crystalline zeolites. In particular, a novel activation process is provided to enhance the alpha value of high-silica ZSM-5 type catalysts by hydrothermal treatment in contact with an inorganic activating agent.

BACKGROUND OF THE INVENTION

Zeolite catalysts have become widely used in the processing of petroleum and in the production of various petrochemicals. Reactions such as cracking, hydrocracking, catalytic dewaxing, alkylation, dealkylation, transalkylation, isomerization, polymerization, addition, disproportionation and other acid catalyzed reactions may be performed with the aid of these catalysts. Both natural and synthetic zeolites are known to be active for reactions of these kinds.

The common crystalline zeolite catalysts are the alumino-silicates such as Zeolites A, X, Y and mordenite. Structurally, each such material can be described as a robust three dimensional framework of $SiO_4$ and $AlO_4$ tetrahedra that is crosslinked by the sharing of oxygen atoms whereby the ratio of total aluminum and silicon atoms to oxygen is 1:2. These structures (as well as other crystalline zeolites of catalytic usefulness) are porous, and permit access of reactant molecules to the interior of the crystal through windows formed of eight-membered rings (small pore) or of twelve-membered rings (large pore). The electrovalence of the aluminum that is tetrahedrally contained in the robust framework is balanced by the inclusion of cations in the channels (pores) of the crystal.

An "oxide" empirical formula that has been used to describe the above class of crystalline zeolites is

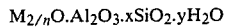

$$M_{2/n}O.Al_2O_3.xSiO_2.yH_2O$$

wherein M is a cation with valence n, x has a value of from 2 to 10, and y has a value which depends on the pore volume of the particular crystal structure under discussion. The empirical oxide formula may be rewritten as a general "structural" formula

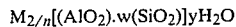

$$M_{2/n}[(AlO_2).w(SiO_2)]yH_2O$$

wherein M and y are defined as above, and wherein w has a value from 1 to 5. In this representation, the composition of the robust framework is contained within the square brackets, and the material (cations and water) contained in the channels is shown outside the square brackets. One skilled in the art will recognize that X in the empirical oxide formula represents the mole ratio of silica to alumina in the robust framework of a crystalline zeolite, and may be referred to herein simply by the expression in common usage, i.e. "the silica to alumina ratio". Further, the term framework, whenever used herein, is intended to refer to the robust framework described above. (See "Zeolite Molecular Sieves", Donald W. Breck, Chapter One, John Wiley and Sons, New York, N.Y. 1974, which is incorporated herein by reference as background material).

With few exceptions, (such as with Zeolite A wherein x=2) there are fewer alumina tetrahedra than silica tetrahedra in the robust frameworks of the crystalline zeolites. Thus, in general, aluminum represents the minor tetrahedrally coordinated constituent of the robust frameworks of the common zeolites found in nature or prepared by the usual synthetic methods.

For the above common zeolite compositions, wherein x has a value of 2 to 10, it is known that the ion exchange capacity measured in conventional fashion is directly proportional to the amount of the minor constituent in the robust framework, provided that the exchanging cations are not so large as to be excluded by the pores. If the zeolite is exchanged with ammonium ions and calcined to convert it to the hydrogen form, it acquires a large catalytic activity measured by the alpha activity test for cracking n-hexane, which test is more fully described below. And, the ammonium form of itself desorbs ammonia at high temperature in a characteristic fashion.

It is generally recognized that the composition of the robust framework of the synthetic common zeolites, wherein x=2 to 10, may be varied within relatively narrow limits by changing the proportion of reactants, e.g., increasing the concentration of the silica relative to the alumina in the zeolite forming mixture. However, definite limits in the maximum obtainable silica to alumina mole ratio are observed. For example, synthetic faujasites having a silica to alumina mole ratio of about 5.2 to 5.6 can be obtained by changing said relative proportions. However, if the silica proportion is increased above the level which produces the 5.6 ratio, no commensurate increase in the silica to alumina mole ratio of the crystallized synthetic faujasite is observed. Thus, the silica to alumina mole ratio of about 5.6 must be considered an upper limit for synthetic faujasite in a preparative process using conventional reagents. Corresponding upper limits in the silica to alumina mole ratio of mordenite and erionite via the synthetic pathway are also observed. It is sometimes desirable to obtain a particular zeolite, for any of several reasons, with a higher silica to alumina ratio than is available by direct synthesis. U.S. Pat. No. 4,273,753 to Chang and the references contained therein describe several methods for removing some of the aluminum from the framework by the use of aggressive treatments such as steaming, contact with chelating agents, etc., thereby increasing the silica to alumina ratio of a crystal. However, no generally useful method appears to have been described for increasing the alumina content of a zeolite crystal. Thus, although it is relatively easy to reversibly alter the composition of the materials (cations and water) contained within the channels of the crystalline zeolites, no generally useful method is known for reversibly altering the content of the minor tetrahedrally coordinated constituent in the structure of the robust framework.

Synthetic high silica content crystalline zeolites have been recently discovered wherein x is at least 12, some forms of these having little or even substantially no aluminum content. It is of interest that these zeolites appear to have no natural counterparts. These zeolites have many advantageous properties and characteristics such as a high degree of structural stability. They are used or have been proposed for use in various processes including catalytic processes. Materials of this type are known in the art and include high silica content aluminosilicates, such as ZSM-5 (U.S. Pat. No. 3,702,886), ZSM-11 (U.S. Pat. No. 3,709,979), and ZSM-12 (U.S. Pat. No. 3,832,449) to mention a few. Unlike the zeolites described above wherein x=2 to 5, the silica to alumina ratio for at least some of the high silica content zeolites is unbounded, i.e. the ratio may be infinitely large. ZSM-5 is one such example wherein the silica to alumina mole ratio is at least 12. U.S. Pat. No. Re. 29,948 to Dwyer et al. discloses a crystalline organosilicate essentially free of aluminum and exhibiting an X-ray diffraction pattern characteristic of ZSM-5 type aluminosilicates. U.S. Pat. Nos. 4,061,724, 4,073,865 and 4,104,294 describe microporous crystalline silicas or organosilicates with very low alumina contents. Some of the high silica content zeolites contain boron which is not reversibly removed by simple ion exchange or other non-aggressive means, i.e. the zeolites contain framework boron.

Because of the extremely low alumina content of certain high silica content zeolites, when such materials are converted to the ammonium form and calcined in the conventional manner to produce the hydrogen form, they are not as catalytically active as their higher alumina content counterparts. In copending U.S. patent application Ser. No. 391,212 filed June 23, 1982 (now abandoned), a method is described for enhancing the acid activity of a high silica content crystalline zeolite having substantially no acid activity, by compositing said zeolite with an acidic inorganic oxide under prescribed conditions.

It is an object of the present invention to provide an improved method for increasing the acidic catalytic activity of a high silica content zeolite that contains framework boron. It is a further object of this invention to provide a method for substituting aluminum for boron contained in the robust framework of a high silica content zeolite. It is a further object of this invention to provide novel catalytic compositions prepared by the method of this invention.

BRIEF SUMMARY OF THE INVENTION

We have now found that the acidic catalytic activity of a high silica content zeolite that has a silica to alumina ratio greater than 100 to 1, and that contains framework boron in an amount of at least 0.1 wt %, is advantageously increased by treating the zeolite crystals with water under conditions effective to hydrolyze from the crystal about 10% to about 95% of the boron contained therein, followed by compositing under hydrous conditions said treated zeolite with fine particles of alumina and calcination of the composite, all as more fully described hereinbelow.

The technique is particularly advantageous for treating the hydrogen form or the ammonium form of a ZSM-5 type zeolite that has a silica to alumina mole ratio greater than 100 to 1, and that has a boron content of at least 0.1 wt %, preferably a content of 0.2 wt % to about 2.5 wt %.

The novel process of this invention permits the preparation of a high silica content zeolite which has all the desirable properties inherently possessed by such high silica materials, and yet has an acid cracking activity (alpha-value) which heretofore has only been possible to achieve with materials having a higher aluminum content in the robust framework.

DETAILED DESCRIPTION AND PREFERRED EMBODIMENTS

As has heretofore been stated, the novel process of this invention is concerned with the treatment of high silica content zeolite that contains at least 0.1 wt % of framework boron. The expression "high silica content" as used herein means a crystalline zeolite structure that has a silica to alumina ratio greater than 100 to 1 and more preferably greater than about 500 to 1 up to and including those highly siliceous materials where the silica to alumina ratio approaches infinity. This latter group of highly siliceous materials is exemplified by U.S. Pat. Nos. 3,941,871, 4,061,724, 4,073,865 and 4,104,294 wherein the materials are prepared from reaction solutions which involve no deliberate addition of aluminum. However, trace quantities of aluminum are usually present as impurities in the forming solutions. The silica to alumina mole ratio may be determined by conventional analysis. The ratio represents, as closely as possible, the ratio in the robust framework of the zeolite crystal, and is intended to exclude materials such as aluminum in the binder or in another form within the channels of the zeolite. The ratio also may be determined by conventional methods such as ammonia desorption/TGA (as described in Thermochimica Acta, 3, pages 113–124 1971), which publication is incorporated herein by reference, or by a determination of the ion-exchange capacity for a metal cation such as caesium.

The preferred high silica content zeolite that is to be activated by the process of this invention has the crystal structure of a zeolite of the ZSM-5 type as evidenced by X-ray diffraction. This type of zeolite freely sorbs normal hexane, and has a pore size intermediate between the small pore zeolites such as Linde A and the large pore zeolites such as Linde X, the pore windows in the crystals being formed of 10-membered rings. The crystal framework densities of this type zeolite in the dry hydrogen form is not less than 1.6 grams per cubic centimeter. It is also known that ZSM-5 type zeolites exhibit constrained access to singly methyl-branched paraffins, and that this constrained access can be measured by cracking a mixture of n-hexane and 3-methylpentane and deriving therefrom a "Constraint Index". ZSM-5 type zeolites exhibit a Constraint Index of about 1 to 12 provided they have sufficient catalytic activity or are activated by the method of this invention to impart such activity. The boron containing ZSM-5 type zeolites useful for the process of this invention have a crystal structure exemplified by ZSM-5, ZSM-11, ZSM-12, ZSM-23, ZSM-35, ZSM-38 and ZSM-48. Column 4, line 30 to column 11, line 26 inclusive of U.S. Pat. No. 4,385,195 issued May 24, 1983, and the U.S. patents referred to therein, are incorporated herein by reference for a detailed description including the X-ray diffraction patterns of the foregoing ZSM-5 type zeolites; for a detailed description of crystal density and method for measuring this property; for a detailed description of Constraint Index and method for measuring this property; and, for matter related to the foregoing.

Methods for preparing high silica content zeolites that contain framework boron known in the art and are not considered part of the present invention. The amount of boron contained therein, for example, may be made to vary by incorporating different amounts of borate ion in a ZSM-5 forming solution, as will be more fully illustrated hereinbelow. Prior to activation by the method of this invention, the chosen zeolite is calcined to remove organic matter. It is then preferably converted by ion exchange to the ammonium form, and most preferably to the hydrogen form by calcination of the ammonium form, by methods known to those skilled in the art. Although either the ammonium or the hydrogen form may be activated, the hydrogen form is particularly preferred since it is most rapidly hydrolyzed. For purposes of the present invention, the zeolite must contain at least about 0.1 wt % boron, although it may contain from 0.1 wt % to about 2.5 wt %. In general, the greater the boron content, the greater the enhancement of catalytic activity.

In a preferred embodiment of this invention, the hydrogen form of the crystals are treated with liquid water at a temperature of about 25° C. to 125° C. for about 0.1 hours to 80 hours to induce hydrolysis with simultaneous removal of boron from the crystals. The ammonium form also may be treated, and even the sodium form, to effect hydrolysis, keeping in mind that these will hydrolyze more slowly than the hydrogen form. However, the hydrolysis of these forms will benefit from use of water which is made mildly acidic, thereby converting in situ the ammonium or the sodium form to the hydrogen form. Saturated steam also may be used to induce or to speed hydrolysis, with or without subsequent washing to remove boron. In general, the contemplated conditions for the hydrolysis are:

|  | Temperature | Time |
|---|---|---|
| broad | 15° C.–200° C. | 0.05–100 hrs. |
| preferred | 25° C.–125° C. | 0.1–80 hrs. |
| most preferred | 50° C.–100° C. | 0.2–20 hrs. |

To complete the activation, the treated crystals are composited under hydrous conditions with an alumina-containing binder to provide a composite containing 10 wt % to 90 wt % of said zeolite crystals. The preferred binders include aluminas, especially alpha alumina monohydrate, and a particularly preferred binder consists of high purity alumina hydrosol (PHFsol) obtained from American Cyanamid Co.) which, when simply mixed with the crystals, provides the requisite water. Alpha alumina monohydrate preferably is composited with the crystals by mulling these together in the presence of water followed preferably by extrusion, as described U.S. patent application Ser. No. 391,212 filed June 23, 1982 (now abandoned), which description is here incorporated by reference as if fully set forth.

After completion of the compositing step and before use as a catalyst, if there is reason to believe that the crystals may contain organic matter and/or unwanted cations, these may be removed from the extrudate by the usual calcination and/or ammonium exchange steps known to those skilled in the art.

While not wishing to be bound by theory, it is believed that the effectiveness of this invention is a result of migration of aluminum into defect sites provided by hydrolysis of boron. Whereas either framework boron, for example, or framework aluminum, would be expected (if in the trivalent state) to be associated with interstitial cations such as hydrogen ions, those associated with boron have a very low or an undetectable catalytic activity for cracking n-hexane under conditions at which hydrogen ions associated with aluminum have a very large activity. As is known in the art, the acid catalytic activity of a zeolite may be measured by its "alpha value", which is the ratio of the rate constant of a test sample in the hydrogen form for cracking normal hexane to the rate constant of a standard reference catalyst. Thus, an alpha value=1 means that the test sample and the standard reference have about the same activity. The alpha test is described in U.S. Pat. No. 3,354,078 and in The Journal of Catalysis, Vol. IV, pp. 522–529 (August 1965); both of which are incorporated herein by reference.

This invention will now be illustrated by examples which are not to be interpreted as limiting the scope thereof, said scope being set forth in the specification including the appended claims. All parts and proportions are by weight unless explicitly stated to be otherwise.

EXAMPLES

EXAMPLE 1

ZSM-5 zeolite free of boron was synthesized and converted to the hydrogen form as follows:

Tetrapropylammonium bromide, 86.4 g, was dissolved in 160 g of water. The solution was added, with stirring, to 1286 g of silica sol (Ludox LS, 30% $SiO_2$). Finally, a solution of 40.8 g of sodium hydroxide (98%) in 80 g of water was added. The reaction mixture was heated in a 2-liter stirred autoclave at 120° C. Crystallization was complete after 82 hours.

The product was separated from the mother liquor by filtration. It was washed with water until free of bromide, and dried at ambient temperature. The dried material gave the X-ray diffraction pattern of ZSM-5.

About 60 g of the dried material was sized 10–14 mesh and calcined for 3 hours at 538° C. in flowing nitrogen; heating rate was 5° F. (2.8° C.)/min. The nitrogen was then replaced with dry air, and the calcination was continued until the material was pure white.

The calcined zeolite was ion exchanged three times with 2700 ml of 0.2N ammonium acetate solution at 160° F. for 2 hours each. The product was washed with water and dried, both at room temperature.

Five grams of the ammonium-exchanged zeolite was converted to the hydrogen form by calcining in air as follows:
4 hours heat-up to 900° F. (482° C.)
4 hours at 900° F. (482° C.)
and 4 hours cooling to ambient temperature.

The calcined, hydrogen form of the ZSM-5, free of boron, is referred to in the examples which follow as Sample A.

The composition and properties of the dried sample before and after ion exchange are shown in Tables I and II.

EXAMPLE 2

ZSM-5 zeolite that contained boron was synthesized and converted to the hydrogen form as follows:

Sodium hydroxide (98%), 20 g, was dissolved in 400 g of water. Boric acid, 31.5 g, was added and dissolved. The remaining solution was added, with stirring, to 475 g of silica sol (Ludox LS, 30% $SiO_2$). Finally, a solution of 31.8 g of tetrapropylammonium bromide in 120 g of water was added with stirring. The reaction mixture was heated in a 2-liter autoclave at 120° C. with vigorous stirring. Crystallization was complete after 86 hours.

The product was separated from the mother liquor, washed and dried in the same manner as described in Example 1. The dried material gave the X-ray diffraction pattern of ZSM-5.

About 60 grams of the dried material was sized and calcined, the calcined material was ammonium exchanged, and five grams of the ammonium exchanged material was converted to the hydrogen form, all as described in Example 1.

The calcined, hydrogen form of the boron-containing ZSM-5 is referred to in the examples which follow as Sample B.

The composition and properties of the dried sample before and after ion exchange are shown in Tables I and II.

TABLE I

Composition of Dried Samples

| Composition | Example 1 | Example 2 |
|---|---|---|
| $SiO_2$, wt. % | 83.82 | 82.88 |
| $Al_2O_3$, ppm | 595 | 550 |
| $B_2O_3$, wt. % | 0 | 2.00 |
| $Na_2O$, wt. % | 1.48 | 0.62 |
| N, wt. % | 0.85 | 0.76 |
| Ash, wt. % | 85.7 | 86.51 |
| $SiO_2/Al_2O_3$, Molar | 2395 | 2560 |
| $SiO_2/(Al_2O_3 + B_2O_3)$, molar | NA | 47.15 |
| $B_2O_3/(Al_2O_3 + B_2O_3)$, molar | 0 | 0.982 |
| Sorption (after calcination at 538° C.). | | |
| Cyclohexane, 20 Torr | 5.3 | 6.5 |
| n-Hexane, 20 Torr | 11.4 | 9.7 |
| Water, 12 Torr | 5.4 | 8.7 |

TABLE II

Composition after Ion Exchange

| | Example 1 | Example 2 |
|---|---|---|
| $SiO_2$, wt. % | 95.7 | 89.78 |
| $Al_2O_3$, ppm | 660 | 615 |
| $B_2O_3$, wt. % | 0 | 1.71 |
| Na, wt. % | 0.01 | 0.01 |
| N, wt. % | 0.03 | 0.67 |
| Ash, wt. % | 97.5 | 91.75 |
| $SiO_2/Al_2O_3$ | 2465 | 2480 |
| $SiO_2/(Al_2O_3 + B_2O_3)$, molar | NA | 59.5 |
| $B_2O_3/(Al_2O_3 + B_2O_3)$, molar | 0 | 0.976 |

EXAMPLE 3

Sample A from Example 1 was treated with 250 ml of water at 190° F. (88° C.) for 2 hours. The treated sample was filtered, washed with water at room temperature and dried at 165° C. The dried sample was analyzed and showed little change in alumina content (830 ppm).

EXAMPLE 4

Sample B from Example 2 was treated as described in Example 3. The dried sample showed no significant change in alumina content (635 ppm). However, the $B_2O_3$ content was 0.64 wt. % compared with 1.71 wt. % before treatment, i.e. about 63% of the boron contained in the ion-exchanged crystals had been removed.

EXAMPLE 5

The ammonium form of the boron-free ZSM-5 of Example 1 was composited with alumina as follows:

Three grams of the zeolite (based on solids) was dispersed in 18.15 g of PHF alumina hydrosol (8.9% $Al_2O_3$) and mixed thoroughly. A mixture of 1.5 ml of concentrated ammonium hydroxide and 1.5 ml of water was added to the slurry with intensive mixing. The obtained mixture was dried at 165° C. for 4 hours and then calcined in a covered crucible using the same temperature program as described in Example 1 for the calcination of the ammonium form.

The product was tested in the alpha test and found to have and alpha value of 8.5.

EXAMPLE 6

The ammonium form of the boron-containing ZSM-5 of Example 2 was composited with alumina as described in Example 5. It was found to have an alpha value of 12.1.

EXAMPLE 7

The product from Example 3 was composited as described in Example 5 and found to have an alpha value of 9.4.

EXAMPLE 8

The product from Example 4 was composited as described in Example 5. It was found to have an alpha value of 15.3.

From the foregoing examples, it is seen that the water treatment illustrated in Example 3 contributes little to the activity of the composite if no boron is present, there is an unexpectedly larger increase when the crystal contains boron which is partially removed by the treatment.

EXAMPLE 9

A sample of ZSM-11 that contained boron was prepared as follows:

Sodium hydroxide, 3.3 g, 1.5 g of boric acid and 22.8 g of tetrabutylammonium bromide were dissolved in 200 g of water. Silica sol (Ludox LS, 30% $SiO_2$) was added with stirring, and the mixture was heated at 140° C. After 91 hours, a well-crystallized material of ZSM-11 structure was obtained. Sorption capacities, g/100 g:

| | |
|---|---|
| Cyclohexane, 20 Torr | 2.5 |
| n-Hexane, 20 Torr | 12.5 |
| Water, 12 Torr | 7.8 |

Chemical Composition:

| | |
|---|---|
| $SiO_2$, wt. % | 81.9 |
| $Al_2O_3$, ppm | 500 |
| $B_2O_3$, wt. % | 1.42 |
| $Na_2O$, wt. % | 1.08 |
| N, wt. % | 0.66 |
| Ash, wt. % | 84.8 |
| $SiO_2/(Al_2O_3 + B_2O_3)$ | 65.3 |
| B/(Al + B) | 0.97 |

A portion of the product is calcined and converted to the ammonium form by the procedure described in Example 1.

An aliquot of the ammonium form is treated with a dilute solution of acetic acid for 6 hours at 200° F., filtered, washed and dried.

Portions of each of the ammonium form and of the water-treated product are composited with alumina and calcined, as described in Example 5.

The composited calcined water-treated product is found to have a substantially higher alpha value than its ammonium-form counterpart which was not subjected to hydrolysis.

What is claimed is:

1. An improved method for enhancing the catalytic activity of a composition consisting essentially of crystals of a high silica content crystalline zeolite that contains from about 0.1 wt % to about 2.5 wt % of framework boron, said crystals having a silica to alumina ratio of at least 100, which method comprises:

treating said crystals with water under conditions effective to hydrolyze from about 10% to about 95% of said boron;

compositing under hydrous conditions said treated crystals with fine particles of an alumina-containing material whereby said catalytic activity is increased; and recovering said composited treated crystals of enhanced catalytic activity.

2. The method described in claim 1 wherein said high silica content crystalline zeolite is of the ZSM-5 type.

3. The method described in claim 2 wherein said high silica crystalline zeolite has a silica to alumina ratio greater than about 500 and is selected from the group consisting of ZSM-5, ZSM-11, ZSM-12, ZSM-23, ZSM-35, ZSM-38 and ZSM-48, and said treating step is conducted with liquid water at a temperature of 15° C. to 200° C. for from 0.05 hrs. to 100 hrs. thereby hydrolyzing and removing from said crystals said 10% to 95% of said boron.

4. The method described in claim 3 wherein said zeolite is ZSM-5.

5. The method described in claim 1 wherein said crystals are converted to the hydrogen form prior to said treatment with water.

6. The method described in claim 2 wherein said crystals are converted to the hydrogen form prior to said treatment with water.

7. The method described in claim 3 wherein said crystals are converted to the hydrogen form prior to said treatment with water.

8. The method described in claim 4 wherein said crystals are converted to the hydrogen form prior to said treatment with water.

9. The method described in claim 1 wherein said alumina is an aqueous alumina sol or alpha alumina monohydrate.

10. The method described in claim 2 wherein said alumina is an aqueous alumina sol or alpha alumina monohydrate.

11. The method described in claim 3 wherein said alumina is an aqueous alumina sol or alpha alumina monohydrate.

12. The method described in claim 4 wherein said alumina is an aqueous alumina sol or alpha alumina monohydrate.

13. The method described in claim 5 wherein said alumina is an aqueous alumina sol or alpha alumina monohydrate.

14. The method described in claim 6 wherein said alumina is an aqueous alumina sol or alpha alumina monohydrate.

15. The method described in claim 7 wherein said alumina is an aqueous alumina sol or alpha alumina monohydrate.

16. The product produced by the method of claim 1 or 2 or 3 or 4 or 5 or 6 or 7 or 8 or 9 or 10 or 11 or 12 or 13 or 14 or 15.

17. The method described in claim 1 wherein said zeolite is ZSM-11.

18. The product produced by the method of claim 17.

* * * * *